INVENTORS.
HARRY F. LONGLEY,
PETER E. BEDFORD-JONES &
THOMAS BATTLE
BY *Fay, Sharpe & Mulholland*
ATTORNEYS

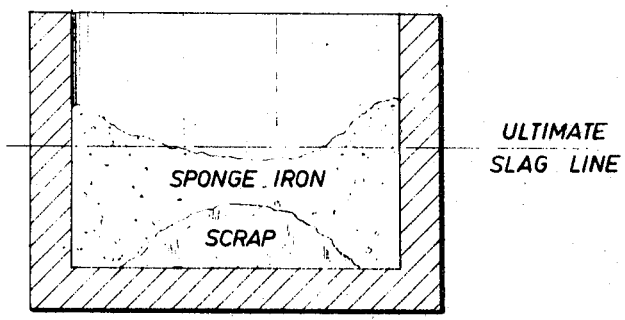
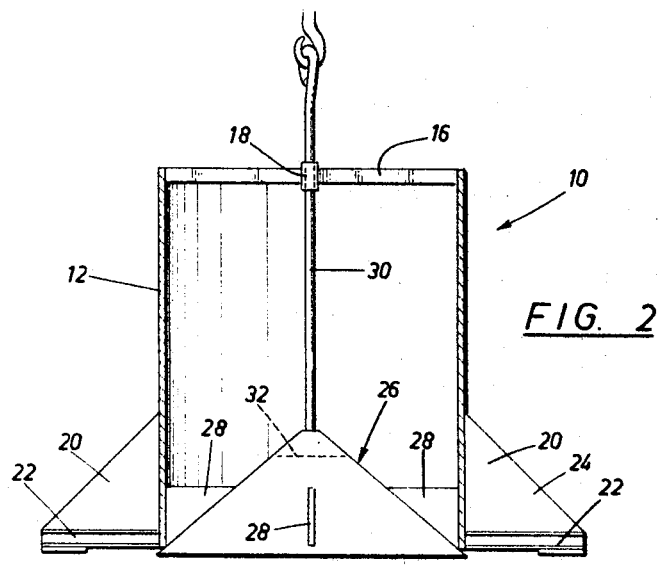
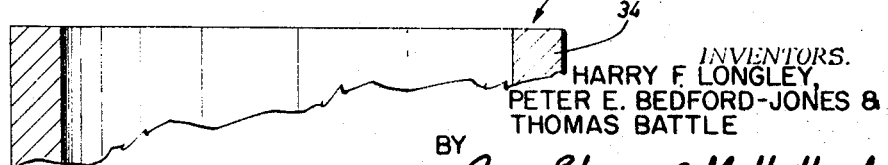

United States Patent Office 3,443,930
Patented May 13, 1969

3,443,930
PERIPHERAL CHARGING OF SPONGE IRON
Harry F. Longley, Hamilton, Ontario, Peter E. Bedford-Jones, Edmonton, Alberta, and Thomas Battle, Sherwood Park, Alberta, Canada, assignors to The Steel Company of Canada, Limited, Hamilton, Ontario, Canada, a company of Canada, Metallgesellschaft A.G., Frankfurt am Main, Germany, a company of Germany, and Pickands Mather & Co., Cleveland, Ohio, a company of Delaware
Filed Aug. 29, 1966, Ser. No. 575,583
Claims priority, application Canada, Aug. 27, 1966, 968,961
Int. Cl. C21c 5/52
U.S. Cl. 75—10   4 Claims

ABSTRACT OF THE DISCLOSURE

A method of melting a mixed charge of scrap material and discrete iron-bearing material such as sponge-iron pellets in amount up to about 90 percent of total charge weight within an electric-arc furnace including the steps of initially charging said discrete material to form a bed at the bottom of the furnace sloping upwardly outwardly in proximity to the walls thereof, at a height essentially lower than the ultimate level of the molten slag surface, loading said scrap material centrally onto said bed to substantially maintain said upwardly sloping bed walls, and initially melting said scrap material to gravitate downwardly over the bed away from the lower walls of the furnace forming a central bath of molten iron whereby effective control of the disposition of the molten iron within the furnace is obtained without the formation of wall accretions and clusters.

---

This invention relates to electric-arc steelmaking and in particular is directed to an improved method and apparatus for charging discrete sponge iron, as a major charge constituent, to an electric-arc steelmaking furnace.

For the production of high quality steel, freedom from metallic impurities such as copper and tin is very important. In many areas of the world, available scrap is of predominantly poor quality being heavily oxidized and containing unknown and oft times considerable amounts of detrimental, non-ferrous impurities. It is desirable, for this reason, to include in the electric-arc furnace charge a sizeable portion of high grade selected scrap, which is expensive and in limited supply, and/or virgin metal such as pig iron or sponge iron. The use of sponge iron in large amounts, provided it can be used without a serious loss in furnace productivity or an increase in electrical energy consumption, is a desirable substitute for purchased scrap since the sponge iron can be supplied with a consistent chemical composition having a low, non-ferrous element content and can be produced in large quantities at a reasonable cost. The use of large quantities of sponge iron in unconsolidated form in an electric-arc furnace, however, gives rise to a number of practical operating problems.

For example, an initial charge placed in a furnace chamber consisting essentially of sponge iron, or of sponge iron disposed as a stratum on top of a scrap charge, results in difficulty in establishing an arc between the electrodes and charge when the electrodes are brought into contact with the sponge iron because of the relatively poor electrical conductivity of the sponge iron. In practice, various schemes have been developed to facilitate the establishment of an arc including heating the sponge iron charge in a closed, hot furnace for about 5 to 6 minutes before attempting to establish electrical contact. Another system involves distributing graphite powder or metal borings over the sponge iron charge at the electrode contact areas to improve electrical conductivity. Although successful in eventually striking an arc, all these systems of achieving initial arc contact represent a delay in steel production and an increase in energy consumption, the delay in initiating meltdown being as much as 1½ to 15 minutes or more.

It has been a general experience of steelmakers when employing large amounts of sponge iron in an electric-arc steelmaking furnace that sponge iron piled high on the furnace walls exhibit a tendency to weld together during the primary stages of meltdown and adhere to the sidewalls in the form of clusters. Once an accretion of this type is formed it must be removed by manually barring it down into the bath since failure to remove these clusters during the meltdown period can lead to difficulties later in the heat. If the unmelted wall accretion or cluster falls into the bath immediately before the tap, it will produce a "dirty" steel and, depending upon the degree of oxidation suffered by the cluster prior to its removal, it can cause a violent gas evolution, explosive in character and potentially dangerous to the furnace personnel when it falls into the bath. The barring down of wall clusters results in considerable time delay and heat loss as the power supply to the furnace must usually be shut off during the barring operation. The furnace performance is further impeded by the presence of these clusters especially after meltdown, in that they tend to float on the bath surface and require an unduly long time to melt under the lowered current and voltage settings employed during the refining period.

Special methods for charging sponge iron into an electric-arc furnace have been reported, such as is disclosed in the article entitled "Electric Furnace Steelmaking with Sponge Iron" from the Iron and Steel Engineer of August 1963. According to the teachings of this article, an initial load of scrap is placed centrally on the furnace bottom and the scrap covered with peripherally charged sponge iron, some of which penetrates into scrap voids while the balance remains on top of the scrap abutting the furnace sidewalls to a level considerably above the ultimate slag line. This article further teaches the maintenance of unmelted sponge iron accretions on the banks abutting the sidewalls in order to "cover and protect the lining against attack by the acid slag formed from the gangue constituents of the sponge." The furnace is operated to obtain rapid penetration of the sponge iron cover by the electrodes and melting of the charge from the bottom upwardly, the void spaces in the scrap providing a reservoir for the sponge iron as it is subsequently melted at the top of the charge and falls by gravity to the furnace hearth.

In experiments carried out for the initial charging of sponge iron or similar discrete, iron-bearing material in granular or pellet form with scrap iron and/or scrap steel in order to make an initial charge for an electric-arc furnace, it has been found that the pellets tend to pack together very tightly in the furnace, thus producing a relatively impermeable layer or layers which tend to trap liquid iron formed in the region of contact between the scrap and the furnace electrodes. Iron thus trapped cools and solidifies in situ, thus welding the pellets together to impede effective melting of the charge and, in addition, the impermeable barrier thus formed prevents gravitation of the liquid iron to the furnace hearth.

We have found that an initial charge to the furnace including a preliminary bed of granular or pelletized iron-bearing material extending across the hearth in concave configuration, at a height essentially lower than the ultimate level of the molten slag surface, having scrap metal then added centrally above onto the discrete material bed, results in molten iron from the initial melting of the scrap being retained and disposed in the center portion of the furnace below the electrodes on the sponge iron, which thereby facilitates heating of the charge, obviates the formation of wall accretions and clusters, and upon subsequent recharging with scrap infiltrated with sponge iron whereby said sponge iron constitutes up to about 90 percent by weight of the charge, also provides a metal bath into which said iron-bearing material can be charged and its melting temperature quickly reached so that this material is also rapidly melted to dissolve into the bath obviating the formation of wall accretions and clusters.

It is therefore a principal object of the present invention to provide a method of introducing an initial charge and subsequent charges having a dense, discrete, high iron-bearing material such as sponge iron, constituting up to about 90 percent by weight of the total charge, within an electric-arc furnace in a simple and facile manner.

It is another object of the invention to provide a method of distributing an initial furnace charge and recharges containing sponge iron to provide control of the melt within the furnace to protect the hearth and sidewalls, obviate wall accretions and formation of clusters and thus to improve furnace operation by minimizing loss in heat time and energy consumption.

And another object of the invention is the provision of an apparatus particularly adapted for providing a peripheral top charge within an electric-arc furnace suitable for use with a single hoist crane.

What has been provided is a method of melting a mixed charge of scrap material and discrete iron-bearing material such as sponge-iron pellets in amount up to about 90 percent of total charge weight within an electric-arc furnace including the steps of initially charging said discrete material to form a bed at the bottom of the furnace sloping upwardly outwardly in proximity to the walls thereof, at a height essentially lower than the ultimate level of the molten slag surface, loading said scrap material centrally onto said bed to substantially maintain said upwardly sloping bed walls, and initially melting said scrap material to gravitate downwardly over the bed away from the lower walls of the furnace forming a central bath of molten iron whereby effective control of the disposition of the molten iron within the furnace is obtained without the formation of wall accretions and clusters.

Thus, there is provided a charging bucket for use with a top-charged receptacle such as a furnace having upwardly extending walls forming a charge receiving zone comprising; an upwardly extending cylindrical bucket sidewall; transversely extending bucket support means including a plurality of flanges formed about and extending radially from the periphery of the sidewall for engagement with and support of the bucket by the furnace walls for supporting the bucket over said receptacle in a receptacle charging position; downwardly movable hopper means forming a bucket bottom closure, having downwardly and outwardly sloping walls encompassed by said bucket walls to form therewith a bucket-like container for particulate solids; and means for positioning said closure means downwardly from a bucket closing position to define with said bucket walls a peripheral discharge area whereby on discharging said bucket over said receptacle a hollow centered charge is deposited therein.

The use of a preferred embodiment of the present invention is described with reference to the following drawings wherein:

FIGURE 1 is an illustration of a peripherally-charged furnace according to a prior art process;

FIGURE 2 is a sectional elevation of the charging bucket according to the present invention being lowered into position over an electric furnace to be charged;

Like reference characters refer to like parts throughout the description of the drawings.

Figure 3:
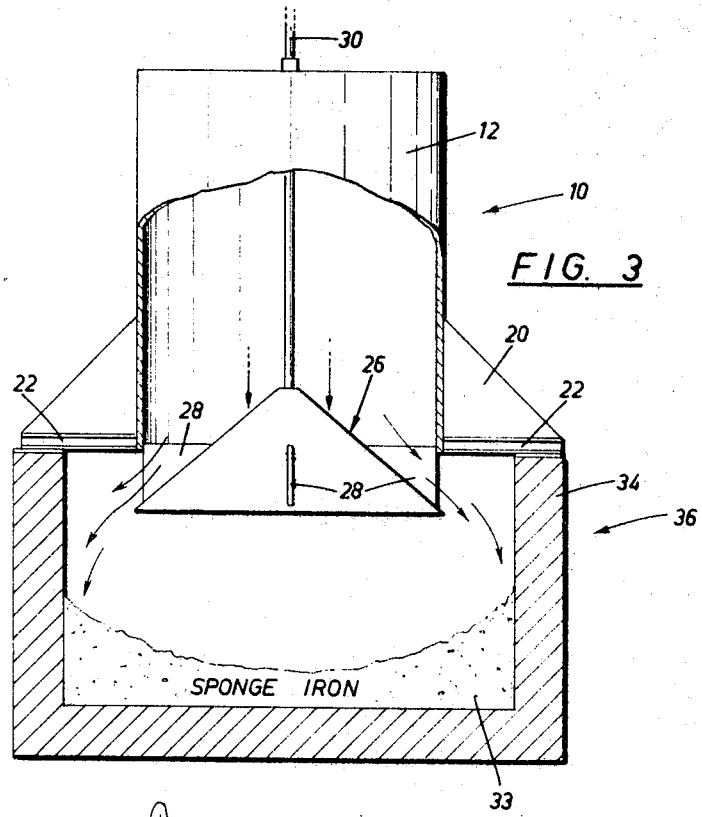
FIGURE 3 is a similar view showing the deposition of particulate, free-flowing sponge iron charge within the furnace.
Figure 4:
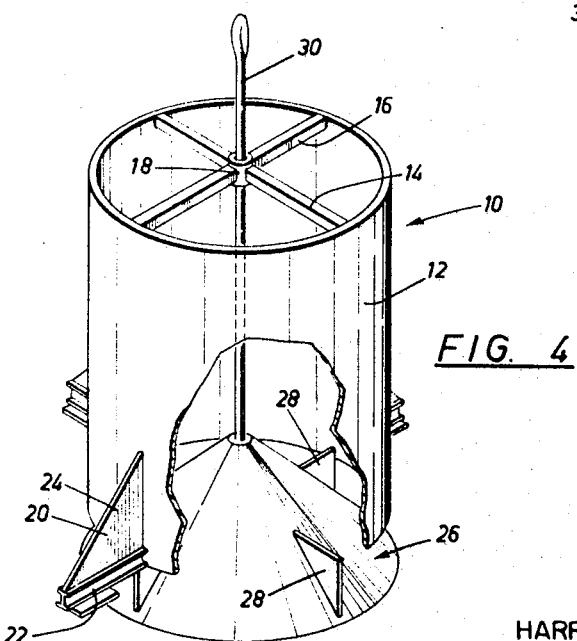
FIGURE 4 is a perspective view in partial section of the improved charging bucket.

The charging bucket comprises the bucket generally designated by the numeral 10 having cylindrical sidewall 12 and the pair of cross members 14, 16 secured to the said sidewall at its top; said cross members 14, 16 intersecting at their respective center points to support guide sleeve 18.

Four support flanges 20 spaced at 90° intervals about the periphery of the bucket at its base and extending radially therefrom each comprises a channel 22 and gusset 24 welded together and to the bucket periphery to form a rigid, integral structure therewith.

Hopper shell 26 forming the base of bucket 10 has four gussets 28 welded at 90° intervals about the periphery of the shell extending radially inwardly for reasons which will become apparent as the description proceeds. Cable 30 extending through sleeve 18 is connected to the apex of hopper shell 26 by cross members 32 welded thereto for raising and lowering the shell 26 relative to the bucket wall 12, and for positioning the bucket 10.

In the operation of the embodiment illustrated typical bucket characteristics are a height of 7½ feet, a diameter of 6 feet, and a basal hopper shell with a slop of about 40° loaded with about 20,000 pounds of sponge iron pellets having a density of 110 pounds per cubic foot. Cable 30 raises the loaded bucket to a stationary position on wall 34 of furnace 36 and cable 30 is then lowered vertically through sleeve 18 about one foot to the position illustrated in FIGURE 3 such that hopper shell 26 is lowered therewith below the bottom edge of shell wall 12, said hopper shell being guided in its downward travel by sleeve 18 and gussets 28. The contents of the bucket are discharged by gravity over the lip of the hopper shell to assume the configuration in the hearth 33 of furnace 36 is illustrated, the height of the sponge iron in proximity to the wall 34 being maintained below the ultimate slag level to insure complete melting of the sponge iron. Once the contents of the bucket are discharged, cable 30 is raised lifting hopper shell 26 to its normally abutting position with the base of the wall 12 and the bucket is then lifted and returned for reloading.

Figure 5:
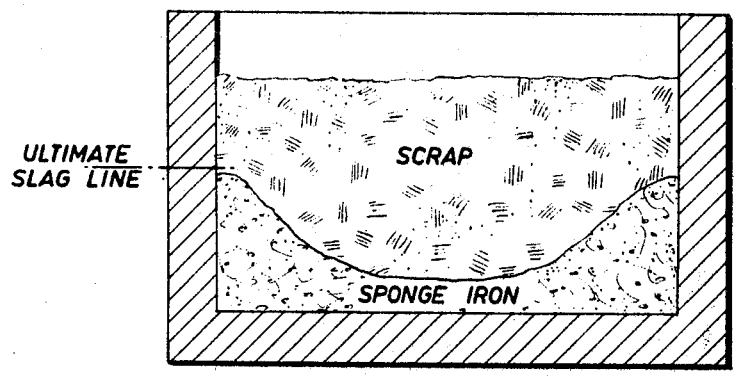
FIGURE 5 is a sectional elevation of the furnace illustrated in FIGURE 3 having a scrap charge added to and centrally disposed over said sponge iron.

Once the desired quantity of discrete, iron bearing material is peripherally charged to the furnace to cover the furnace hearth and portion of the sidewalls, the cavity remaining in the center of the furnace is filled with scrap material as illustrated in FIGURE 5, by means of a conventional drop-leaf charging bucket, not shown. After closing the roof, the electrodes are then lowered into the furnace and the power turned on. Since the electrodes first come into contact with the scrap portion of the charge, no problem is encountered with establishing an arc. The electrodes bore down through the charge with the molten metal that is formed flowing downwardly and collecting in a pool in the cavity at the bottom of the furnace formed by the peripherally charged sponge iron pellets. The concentration of the molten metal in a bath directly below the electrodes increases the rate of heating and the bath quickly reaches melting temperatures with the underlying sponge iron pellets melting progressively from top to bottom without the formation of floating clusters or wall accretions. Furthermore, the sponge iron charged in this manner melts without suffering serious oxidation as has been found to happen when wall accretions form and are present in the furnace during the latter stages of meltdown and/or during refining.

After the initial charge is substantially melted, sufficient space is available in the furnace chamber to permit the next charge to be made. The power is turned off and the roof removed. The sequence for adding metallics is now reversed from that employed in the initial charge; i.e., the scrap is added first and the sponge iron pellets second. The scrap is charged to the furnace in such a way that the surface of the scrap is level or slightly concaved to form a dish. The pellets are then charged centrally on top of the loose scrap and, on contacting the scrap, tend to filter between the loose pieces of scrap metal filling the voids in the scrap portion of the charge.

The roof is again closed, the electrodes positioned, and the power turned on. The thin layer of pellets remaining on top of the scrap does not provide any problems with the establishment of an arc, these pellets reaching their softening temperature rapidly due to the heat retained in the bottom of the furnace from the previously melted charge. Since the scrap against the furnace sidewall maintains the pellets away from this area, no wall accretions are formed.

Figure 6:
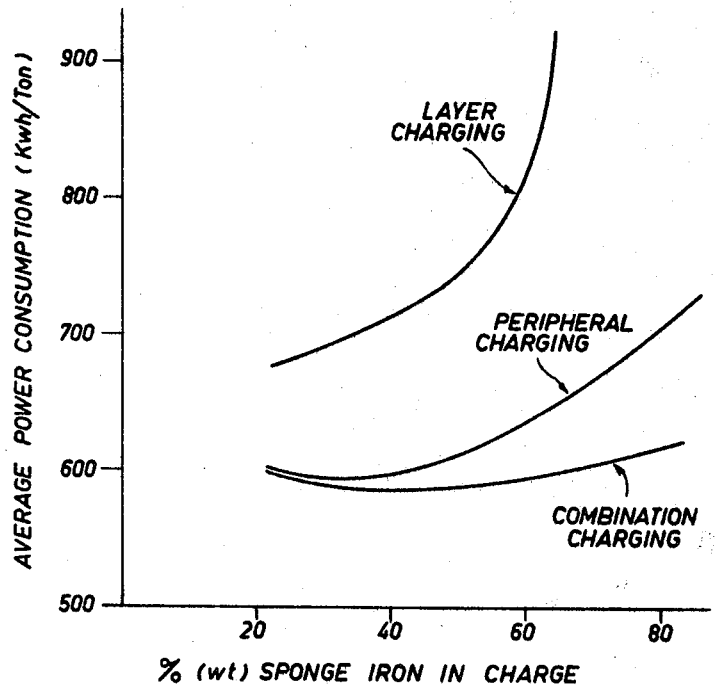
FIGURE 6 is a graph showing average power consumptions plotted against percentage sponge iron contents of the total charge.

With reference now to FIGURE 6 steelmaking operations will now be described by way of example of (1) a heat made according to the process of the present invention, referred to hereunder as "combination charging;" (2) a heat made by using peripherally charged sponge iron pellets in all recharges referred to hereunder as "peripheral charging;" and (3) a heat made by conventional charging methods referred to hereunder as "layer charging." All test heats were performed in a 4700 kva. Taglaferri electric arc steelmaking furnace having a shell diameter of 10 feet and a rated capacity of 15 tons.

In the heat employing "layer charging" the sponge iron and scrap were alternately dropped into the furnace chamber in the form of layered mounds generally convex in shape, not shown. With 60 percent of the metallic charge consisting of sponge iron pellets of the analysis given in Table I, the total energy consumption per ton of steel tapped was 1174 kwh. and the production rate was 3.58 tons per hour.

TABLE I

Chemical analysis of sponge iron pellets

| Constituent: | Wt. percent |
| --- | --- |
| Total Fe | 91.5 |
| Metallic Fe | 87.7 |
| Carbon | 0.198 |
| Sulphur | 0.008 |
| Phosphorus | 0.007 |
| $SiO_2$ | 3.32 |
| CaO | 0.33 |
| MgO | 1.42 |
| $Al_2O_3$ | 0.31 |

In the heat employing "peripheral charging," the first charge contained about 8,000 lbs. of sponge iron pellets placed on the bottom of the furnace by means of a peripheral charging bucket followed by about 7,000 lbs. of scrap from a drop-leaf bucket. In all subsequent recharges this procedure was repeated with variable amounts of sponge iron pellets depending upon the percentage to be used. With 60 percent of the metallic charge consisting of sponge iron pellets of the analysis given in Table I, the total energy consumption per ton of steel for the heat was 754 kwh. and the production rate was 5.04 tons per hour. This test showed that the second peripheral charge of sponge iron pellets generally reached such a height on the walls of the furnace that splashing of slag and metal from the bath impaired the flowing action of the pellets resulting in the formation of a wall accretion.

In the heat employing "combination charging" as practiced in the method of the present invention, about 8,000 lbs. of sponge iron were placed on the bottom of the furnace by means of a peripheral charging bucket followed by about 7,000 lbs. of scrap from a drop-leaf bucket. In the recharges, the scrap was placed first in the furnace chamber with sponge iron pellets being charged by means of an electromagnet. With 75 percent of the metallic charge consisting of sponge iron pellets of the analysis given in Table I, the total energy consumption per ton of steel tapped for the test heat was 601 kwh. and the production rate was 6.22 tons per hour. This represents a 74 percent improvement over the "layer charging" heat.

The present invention provides a number of important advantages. It is believed the concavity of the peripherally charged, relatively molten-iron impermeable sponge iron controls the flow to and collection and disposition of the initially molten scrap material in the central portion of the furnace resting on the sponge iron above the hearth. The sponge iron centrally charged onto the scrap in the recharges to infiltrate and fill void spaces in the scrap surprisingly does not obstruct the flow of molten iron or impede the rate at which the charge is melted but, conversely, facilitates the melting down of the charge. The peripheral and combination charging of discrete iron-bearing material to the furnace, with centrally charged scrap material on the peripherally charged sponge iron, results in the formation of a high density charge which permits improved control and efficiency of the meltdown step. Low residual iron-bearing material of known composition constituting up to about 90 percent of the charge can be utilized in the furnace thereby facilitating control and predetermination of the eventual steel analysis.

It will be understood, of course, that modifications can be made in the preferred embodiment of the invention described and illustrated herein without departing from the scope of the appended claims.

We claim:

1. A method of melting a mixed charge of scrap material and discrete iron-bearing material within an electric-arc furnace comprising the steps of initially peripherally charging said discrete material to form a bed on the hearth of the furnace sloping upwardly outwardly in proximity to the furnace walls, at a height essentially lower than the ultimate level of the molten lag surface, loading scrap material centrally onto said bed to substantially maintain said upwardly sloping bed surface, and initially melting said scrap material to gravitate downwardly over the bed away from the walls of the furnace forming a central bath of molten iron whereby effective control of the disposition of the molten iron within the furnace is obtained obviating the formation of wall accretions and clusters.

2. In a method as claimed in claim 1, substantially completely melting said scrap material and, in subsequent charges, initially charging scrap material to said furnace onto said central bath of molten iron and infiltrating said scrap material with a discrete iron-bearing material.

3. In a method as claimed in claim 1, said discrete material being present in amount up to about 90 percent of the total charge weight.

4. In a method as claimed in claim 1, said discrete material being sponge iron present in amount up to about 90 percent of the total charge weight.

References Cited

UNITED STATES PATENTS

| | | | |
|---|---|---|---|
| 1,991,008 | 2/1935 | Brassert | 75—38 X |
| 2,208,245 | 7/1940 | Boynton | 75—43 X |
| 2,515,764 | 7/1950 | Driscoll | 75—11 X |
| 2,861,879 | 11/1958 | Michalke | 75—43 X |
| 2,971,040 | 2/1961 | Sem | 75—11 X |
| 3,150,961 | 9/1964 | Collin | 75—11 |
| 3,153,588 | 10/1964 | Madaras | 75—43 X |
| 3,163,521 | 12/1964 | Rinesch | 75—38 X |
| 3,165,398 | 1/1965 | Shimamura | 75—43 X |
| 3,232,595 | 2/1966 | Balster | 75—43 X |
| 3,264,094 | 8/1966 | Robinson | 75—11 X |
| 3,295,955 | 1/1967 | Cordier | 75—11 |

L. DEWAYNE RUTLEDGE, *Primary Examiner.*

J. E. LEGRU, *Assistant Examiner.*

U.S. Cl. X.R.

75—43, 38